United States Patent
Branagan

(10) Patent No.: US 7,482,065 B2
(45) Date of Patent: Jan. 27, 2009

(54) LAYERED METALLIC MATERIAL FORMED FROM IRON BASED GLASS ALLOYS

(75) Inventor: Daniel James Branagan, Idaho Falls, ID (US)

(73) Assignee: The Nanosteel Company, Inc., Providence, RI (US)

( * ) Notice: Subject to any disclaimer, the term of this patent is extended or adjusted under 35 U.S.C. 154(b) by 42 days.

(21) Appl. No.: 10/852,670

(22) Filed: May 24, 2004

(65) Prior Publication Data

US 2008/0318080 A1  Dec. 25, 2008

Related U.S. Application Data

(60) Provisional application No. 60/472,963, filed on May 23, 2003.

(51) Int. Cl.
*B32B 15/18* (2006.01)
*F41H 5/04* (2006.01)

(52) U.S. Cl. .................. 428/635; 428/653; 428/660; 428/685; 89/36.02; 427/456; 427/405; 427/427

(58) Field of Classification Search ............ 428/615, 428/635, 650, 653, 655, 656, 660, 668, 671, 428/686, 911, 926, 937; 2/412; 89/36.02; 109/85; 148/527, 530, 531
See application file for complete search history.

(56) References Cited

U.S. PATENT DOCUMENTS

| | | | |
|---|---|---|---|
| 3,295,198 A * | 1/1967 | Coan .................. 29/527.4 |
| 3,986,867 A * | 10/1976 | Masumoto et al. ......... 148/403 |
| 4,090,011 A | 5/1978 | Barkman et al. |
| 4,555,186 A * | 11/1985 | Scruggs .................. 384/93 |
| 4,606,977 A * | 8/1986 | Dickson et al. ............ 428/553 |
| 4,711,795 A * | 12/1987 | Takeuchi et al. .......... 427/130 |
| 5,294,462 A * | 3/1994 | Kaiser et al. .............. 427/446 |
| 5,643,531 A * | 7/1997 | Kim et al. ................ 420/64 |
| 6,258,185 B1 * | 7/2001 | Branagan et al. .......... 148/525 |
| 6,689,234 B2 * | 2/2004 | Branagan ................. 148/660 |
| 6,767,419 B1 * | 7/2004 | Branagan ................. 148/527 |
| 7,067,020 B2 * | 6/2006 | Poon et al. ................ 148/403 |
| 2003/0008168 A1 * | 1/2003 | Shibuya et al. ............ 428/670 |
| 2003/0051781 A1 | 3/2003 | Branagan |

FOREIGN PATENT DOCUMENTS

| | | |
|---|---|---|
| DE | 3800453 | 7/1989 |
| DE | 3800453 A1 * | 7/1989 |
| DE | 3643774 | 1/1996 |
| WO | WO 03/078158 A1 * | 9/2003 |

OTHER PUBLICATIONS

Translation of DE 3643774.*
Translation of DE 3800453.*
International Search Report dated Jan. 13, 2005, 4 pages.
European Supplemental Search Report dated Oct. 23, 2006 received in corresponding European Patent Application Serial No. 04753177.7 (3 pages).

* cited by examiner

*Primary Examiner*—John J Zimmerman
(74) *Attorney, Agent, or Firm*—Grossman, Tucker, Perreault & Pfleger, PLLC

(57) ABSTRACT

A multi-layered metallic material comprising a metallic glass layer comprising an alloy layer that has a hardness of at least about 9.2 GPa and a metal layer having a hardness of less than about 9.2 GPa. In application form, an armor structure is provided that is suitable for protecting against ballistic projectiles.

8 Claims, No Drawings

LAYERED METALLIC MATERIAL FORMED FROM IRON BASED GLASS ALLOYS

CROSS REFERENCE TO RELATED APPLICATIONS

This application claims priority to U.S. Provisional Application No. 60/472,963 filed May 23, 2003.

FIELD OF THE INVENTION

The present invention is directed at layered metallic material characterized by the use of layered metal material with varying mechanical properties within each layer such as hardness and ductility. More specifically, the present invention is directed at the use of such layered material for protecting against ballistic projectiles and a system for making the same. The present invention therefore also relates to armor suitable for use against armor piercing projectiles. For example, an armor system is provided that combines hard metal layers, which can resist penetration and/or produce blunting of a projectile, and tough metal layers, capable of absorbing projectile energy, to provide an overall synergistic performance in an armor application.

BACKGROUND OF THE INVENTION

Armor piercing projectile, such as may be fired by tanks, artillery, machine guns etc. generally rely on a pointed tip of hardened steel, tungsten, etc. to penetrate a target. The pointed tip of the armor piercing projectile presents a small impact area and, therefore, a high impact stress. The high impact stress allows the armor piercing projectile to pierce and penetrate a structure.

Armor or ballistic resistant materials directed at defeating armor piercing projectiles are generally selected for hardness. Harder materials offer several advantages for defeating armor piercing projectiles. First, harder materials provide a greater resistance to penetration. Harder materials, also, will be able to blunt, or flatten out the pointed tip of an armor piercing projectile. Blunting the pointed tip of a projectile will increase the impacting surface area of the projectile which will decrease the impacting stress applied by the projectile. Additionally, in the case of a harder material, if the projectile does not strike an armored structure normal to the surface, there is a possibility that a hard surface may deflect the projectile. Because of the benefits of high hardness materials, often the most effective armor is armor grade ceramics, such as CAP3 alumina or hot-pressed silicon carbide, which have hardness levels which exceed that found in conventional metals.

Hardness alone is not the only important property for armor materials. Desirably, the armor material will also be tough enough so that it can provide multi-hit capability or protection. While ceramic armor materials are very hard and provide good armor piercing protection, due to the brittleness of the material, ceramics do not generally provide multi-hit capability. Typically, after an initial impact, the ceramic material will fracture or shatter. To mitigate this effect, ceramic armor is often applied in the form of small hexagonal tiles. While the armor tiles still fracture after being hit, the fracture may be contained to only those tiles at the point of impact. Therefore, the damage and attendant loss of protection is limited only to those tiles struck by the projectile. The remainder of the armor system may remain generally intact, and the potential for penetration may be minimizes, since nearby panels will not be affected and overall protection is maintained as long as additional projectiles do not hit the same area.

While armoring steel often will not offer the same level of initial-hit protection provided by ceramics, for many applications armoring steel is used because it provides greater multi-hit protection. Unfortunately, for many applications involving aircraft or mobile ground systems including tanks and armored personal vehicles, a weight is a critical consideration. It is often desirable, or even necessary that the armor have relatively low density in order to minimize weight to allow for system transportability, system payload, and for range/fuel consumption. Ceramics have an inherent advantage in density compared to metals since they are made up of high fractions of relatively light elements such as oxygen (i.e. oxides) or carbon (i.e. carbides).

It is apparent, therefore, that no one material has all of the desired characteristics for armor piercing protection. Existing armoring steel exhibits advantageous multi-hit capability, but is heavy because of steel's relatively high density and the thicknesses of steel armor systems required to defeat incoming projectiles. By contrast, ceramic armor is lightweight and very hard, but does not offer multi-hit capability. Other lightweight metallic materials, such as aluminum, may have the toughness required to provide multi-hit capability, but these materials are generally soft and offer only limited ballistic resistance.

It is therefore an object of the present invention to provide a layered metallic material wherein the layers are selectively altered in their mechanical property characteristics to provide an overall layered configuration that optimizes the response of the layered material to a high impact focused stress, such as that provided by armor piercing projectiles.

In addition, it is an object of the present invention to provide the aforementioned layered metallic material, by the use of a layer of an iron based glass alloy material, and a layer of aluminum.

It is also an object of this invention to therefore provide an armor system which not only exhibits synergistic hardness and ductility characteristics, but which also provides multi-hit protection and is relatively lightweight.

SUMMARY OF THE INVENTION

In a first embodiment, the present invention is directed at a multi-layered metallic material comprising a metallic glass layer comprising an alloy that has a hardness of at least about 9.2 GPa and a metal layer having a hardness of less than about 9.2 GPa.

In a second embodiment, the present invention is directed at a method for protecting against a ballistic projectile comprising supplying a an iron based glass forming alloy with a hardness value of x, supplying a metal layer adapted of hardness value y wherein x>y, applying said iron based glass forming alloy onto metal layer to form a multi layered material adapted to resist penetration by said projectile, thereby forming a layered armor structure, and locating said layered armor structure in an anticipated path of said projectile.

DESCRIPTION OF PREFERRED EMBODIMENTS

As noted above, the present invention is directed at a layered metallic material characterized by the use of layered metal material with varying mechanical properties within each layer such as hardness and ductility. One of the layers therefore preferably has a hardness that is greater than the hardness of the underlying layer, to provide the layered metallic material herein.

In that context, reference is made to U.S. applications Ser. Nos. 09/709,918, now U.S. Pat. No. 6,767,419 and 10/172,095, now U.S. Pat. No. 6,689,234, which disclose the preferred material for the high hardness material of the herein disclosed layered construction, and whose teachings are incorporated by reference. As disclosed therein, a hardened metallic material can be formed by forming a molten alloy and cooling said alloy to form a glass coating on a substrate. Such metallic glass coating has a hardness that is at least about 9.2 GPa, comprising an alloy preferably containing fewer than 11 elements. However, mixtures of the present invention can more preferably comprise fewer than nine elements. Additionally, the mixtures can comprise as few as two elements. Generally, mixtures of the present invention are composed of from four to eight elements, or four to six elements. Among such elements are iron; chromium which can be added for corrosion resistance, boron and/or phosphorous which can be included to generate a particular glass transition temperature, and one or both of molybdenum and tungsten which can be included for hardness. In addition, it is preferable that the metallic glass coating that has a hardness that is at least about 9.2 GPa does not make use of nickel or cobalt.

More specifically, with respect to the development of a layer with high hardness, the invention herein also encompasses methodology for forming metallic glass steel materials and for forming steel materials having nanocrystalline scale composite microstructures, methods of utilizing such steel materials, and also encompasses the steel material compositions as used herein in layered configuration. As an initial step a mixture of elements is formed. Such mixture may comprise a steel composition. A further preferred mixture herein for use in layering comprises at least 50-55% iron, by weight, and can comprise at least one element selected from the group consisting of B, C, Si and P. In particular aspects of the present invention, the mixture will comprise at least two of B, C and Si. The mixture can comprise B, C and Si, and in particular embodiments the mixture can comprise B, C and Si at an atomic ratio of $B_{17}C_5Si_1$. In particular aspects of the present invention, the mixture can contain at least one transition metal which can be, for example, selected from the group consisting of W, Mo, Cr and Mn. In addition, the mixture can contain one or more of Al and Gd.

More preferably, the alloy for the hardened layer herein may comprise one or more materials selected from the group consisting of $(Fe_{0.85}Cr_{0.15})_{83}B_{17}$
$(Fe_{0.8}Cr_{0.2})_{83}B_{17}$
$(Fe_{0.75}Cr_{0.25})_{83}B_{17}$
$(Fe_{0.6}Co_{0.2}Cr_{0.2})_{83}B_{17}$
$(Fe_{0.8}Cr_{0.15}Mo_{0.05})_{83}B_{17}$
$(Fe_{0.8}Cr_{0.2})_{79}B_{17}C_4$
$(Fe_{0.8}Cr_{0.2})_{79}B_{17}Si_4$
$(Fe_{0.8}Cr_{0.2})_{79}B_{17}Al_4$
$(Fe_{0.8}Cr_{0.2})_{75}B_{17}Al_4C_4$
$(Fe_{0.8}Cr_{0.2})_{75}B_{17}Si_4C_4$
$(Fe_{0.8}Cr_{0.2})_{75}B_{17}Si_4Al_4$
$(Fe_{0.8}Cr_{0.2})_{71}B_{17}Si_4C_4Al_4$
$(Fe_{0.7}Co_{0.1}Cr_{0.2})_{83}B_{17}$
$(Fe_{0.8}Cr_{0.2})_{80}B_{20}$
$(Fe_{0.8}Cr_{0.2})_{76}B_{17}Al_7$
$(Fe_{0.8}Cr_{0.2})_{79}B_{17}W_2C_2$
$(Fe_{0.8}Cr_{0.2})_{81}B_{17}W_2$ and
$Fe_{64}Ti_3Cr_5Mo_2B_{16}C_5Si_1Al_2La_2$.

The coating for layering herein also preferably includes an iron based alloy that may be spray coated to the metal substrate. Preferably the iron based alloy is applied to the metal substrate using thermal spray coating techniques. Such techniques may include flame spraying, plasma spraying, wire-arc, detonation gun, cold spraying, and high velocity oxy-fuel (HVOF).

In the context of the present invention, multi-layered configuration is preferred. This should be understood to mean that the metallic glass layer of hardness of at least about 9.2 GPa and said metal layer of hardness of less than 9.2 GPa are in alternating layered structure, and therefore may preferably comprise three or more layers of multi-layered configuration. The metallic glass layer being bonded to the metal layer with a bond strength of at least 5,000 psi.

Consistent with the present invention, the above reference iron based alloys, which are marketed under the name Superhard Steel Alloys™, have been found to be processable by the above referenced spray leading to high hardness. The iron based glass forming alloys herein therefore exhibit extreme hardness when processed by various methods into high performance coatings for the layering applications disclosed herein.

Turning then to the preferred layer of material that provides a layer of reduced hardness and increased ductility, preferably, such layer of material has a hardness that is less than 9.2 GPa, and which layer provides more ductility than those layers of hardened metal that may be both above and below such layer of reduced hardness and ductility. In that context, preferably, such layer of material will comprise aluminum and aluminum alloys, such as 7075, 6061, and 5083.

In addition to aluminum and aluminum alloys, the reduced hardness material may be a metal or alloy forming face centered cubic (FCC) or body centered cubic crystal structures. Exemplary metals may iron, copper, manganese, nickel, and alloys thereof. Titanium while exhibiting a hexagonal, closest packed structure may also be suitable, offering the additional advantage of moderately low density (4.5 $g/cm^3$).

Expanding upon the above, the present invention provides a new type of armor especially resistant to ballistic armor piercing projectiles. In broad terms, the armor of the present invention is made up of two, or more, different types of metals which are applied in alternating layers. Preferably, as noted, one metal layer is generally characterized as a tough/ductile layer (hardness less than 9.2 GPa) and the other is generally characterized as a hard layer (hardness of at least about 9.2 GPa). The hard layer(s) blunt and resist penetration of the projectile, as well as deflecting the projectile. The tough, or soft layer is provided to absorb the energy of the projectile. Successive layers act in series to blunt the round and absorb its energy can be highly effective at defeating the penetration of incoming projectiles.

According to one exemplary embodiment of the invention, the hard layers and tough layers may respectively include the aforementioned metallic glass having a hardness of at least about 9.2 GPa, and aluminum. While the hardness of the glass forming iron alloy with a hardness of at least about 9.2 GPa is effective at resisting penetration, blunting, and deflecting armor piercing projectiles, the high hardness alone does not make it perfectly suited for absorbing the impact from the projectile.

Aluminum exhibits complementary characteristics since it is extremely tough and low density while not particularly hard. Glass forming iron alloys, while providing the necessary penetration resistance, blunting, and/or deflecting characteristics to withstand a single projectile, as noted, may not have the optimum toughness on their own to provide multi-hit protection. An armor structure of the present invention therefore provides the unique combination high hardness and high toughness allowing multi-hit protection from armor piercing projectiles.

Additionally, the glass forming iron alloy herein with a hardness of at least about 9.2 GPa, can have a density of approximately 7.5 g/cm$^3$, which is generally consistent with conventional steels, which is higher than ceramic armor such as alumina, having a density of about 3.9 g/cm$^3$, or silicon carbide having a density of about 3.1 g/cm$^3$. By contrast to such glass forming iron alloy, aluminum has a density of approximately 2.7 g/cm$^3$, somewhat lower than ceramic armor. When the glass forming iron alloy and aluminum are therefore provided in a layered structure, the density of the layered armor falls between the 7.5 g/cm$^3$ of glass forming iron alloy and the 2.7 g/cm$^3$ of aluminum based on the relative proportions of each material in the layered structure.

The proportion of glass forming iron alloy and aluminum may therefore be adjusted to achieve the desired/necessary combination of hardness and toughness/energy absorption, thereby engineering the layered metallic material herein to suit a specific application. For example, in situations where repeated barrages of relatively soft armor piercing projectiles is anticipated, less/thinner layer(s) of glass forming iron alloy are required to provide adequate protection. This configuration is preferable when multi-hit protection is more important than protection against a limited number of highly piercing projectiles.

If less frequent, or less directed barrage by harder or more penetrating projectiles is expected, more/thicker layer(s) of glass forming iron alloy may be provided relative to the aluminum. This last configuration may provide great penetration resistance, blunting, and/or defection of projectiles with decreased multi-hit capability, which may be acceptable if a low occurrence of strikes to same location is anticipated.

While steel and aluminum are not generally compatible, consistent with the present invention, the glass forming iron alloy has been shown to have a unique ability to bond to aluminum when applied using a thermal spray approach. Exemplary thermal spray methods, as previously noted, include flame spray, plasma spraying, wire-arc, detonation gun, cold spray, high velocity oxy-fuel (HVOF) etc.

The uniquely high bonding strength of the glass forming alloys herein and aluminum is especially advantageous in the instant application of an armor structure. Because of the high bond strength of the glass forming iron alloy and the aluminum, when an armor structure according to the present invention is impacted by a projectile the glass forming iron alloy layer(s) will remain bonded to the energy absorbing aluminum. This may be important for providing multi-hit protection. When the armor structure is impacted by a projectile, the glass forming iron alloy layer may fracture. However, because of the high bond strength fractured pieces of glass forming iron alloy may remain bonded to the adjacent aluminum layers. Accordingly, the fractured armor structure may be analogized to a tiled or scaled structure. Unless the armor structure is impacted by a projectile along one of the fracture lines the "tile" or "scale" of glass forming iron alloy will still resist penetration by the projectile and/or provide the blunting and/or deflecting effect.

Furthermore, in the case of a multi-layered armor structure including numerous layers of aluminum and glass forming iron alloy, even if all of the iron alloy layer through the entire thickness of a region of the armor structure were to fracture, the integrity of the armor structure may be largely retained. It is unlikely that the fracture lines in the successive layers of glass forming iron alloy will be aligned through the thickness of the armor structure. Therefore, even if a projectile impacts a fracture line on an outer surface of glass forming iron alloy and is able to penetrate the first layer of iron alloy and aluminum, the projectile will probably impact at least a scale or tile of one of the other layers of glass forming iron alloy that will stop the projectile.

Consistent with the present invention, a layered armor structure may be produced by spraying alternating layers of glass forming iron alloy and aluminum. For example, a coating of glass forming iron alloy may be thermal sprayed on to an aluminum substrate, using know thermal spray techniques including those listed above. The glass forming iron alloy coating may be built up to any desired thickness. While the thickness of the individual layers may vary widely, in an exemplary embodiment the layer thicknesses may be between about 50-500 μm. After application of the glass forming iron alloy coating, an aluminum layer may be thermal spray coated on to the iron alloy coating. The build up of alternating layers of hard material and tough material may be carried out for as layers as desired and/or necessary to satisfy particular design requirements. It should be understood that the thickness each of the individual layer may be varied according to design specifications. That is, the various layers do not need to be the same thickness.

One additional and particularly advantageous aspect of the invention accrues from the spray coating process. The spray coating process allows a very hard coating of glass forming iron alloy, as well as the aluminum coating, to be easily provided in complex geometries. The layers of the armor structure may be built up on an aluminum substrate, which is inherently easily formable. Alternatively, no aluminum substrate may be used. The initial layer of the armor structure, as well as all subsequent layers of the structure, may be thermal sprayed on to a form or a mold that may be either removed after a sufficiently thick layered structure is formed, or may be integrated into the final armor structure. Exemplary molds may include metal forming sand, ceramics materials, metal molds, fiber reinforced plastic structures, etc.

It should also be noted that the layered armor structure of the present invention has been described in terms of an armor structure for protecting against armor piercing projectiles. Such armor piercing projectiles may be of a military nature, as alluded to above, including armor piercing bullets, cannon projectiles, artillery projectiles, etc. However, it should be understood that the practical application of the present invention generally provides an armor system for protecting against projectiles of any nature.

EXPERIMENTAL EVALUATION

It has been experimentally determined that metallic glass layer of the present invention has the unique ability to develop high strength bonds with aluminum to provide a layered structure consistent with the present invention. As an example, when the iron based metallic glass alloy as disclosed herein is applied to an aluminum substrate via either HVOF or wire-arc spraying, relatively high bond strengths are developed, as measured using ASTM C633, as shown in Table 1. It should be noted that that bond strength data reported in Table 1 for the HVOF thermal spray coating indicates glue failure during bond strength testing, not coating failure. Accordingly, the actual bond strength exceeds the stresses reported in the table.

TABLE 1

Summary of Bond Strength of Iron Based Glass Alloys To Aluminum

| Substrate | Coating Thickness (mil) | Bond strength (psi) |
|---|---|---|
| HVOF | aluminum | 40 | >13132 |
| HVOF | aluminum | 40 | >12436 |
| HVOF | aluminum | 40 | >13205 |
| Wire Arc | aluminum | 40 | 5492 |
| Wire Arc | aluminum | 40 | 5501 |
| Wire Arc | aluminum | 40 | 6461 |
| Wire Arc | aluminum | 20 | 10822 |

Additionally, as alluded to above, by the favorable mixture of steel and aluminum high ballistic resistance armor can be developed having a density that is lower that of the iron based glass alloy alone. Referring to Table 2, the resultant density is shown based on the weight fraction of steel and weight fraction of aluminum used in the layered structure. The data clearly shows that layered, or composite armor can be developed which will exhibit much lower density than that of the iron based glass alloy alone. As an example consider a 75 wt-% Al/25 wt-% Steel alloy structure, which would have a density of 3.87 g/cm$^3$ which is the same density of Al2O3, a conventional ceramic armor material. Additionally, the layers of aluminum and iron based glass alloy can be produced which are near full density using optimized coating parameters. Alternatively, the layers of aluminum and iron based glass alloy can be applied under modified thermal spraying parameters which yield a porous layer having a layer density that is less that the density of the solid material. Such a porous layer results in a lower total weight for a given thickness of protection. Accordingly, the density of an armor structure is not only based on the relative proportions of the constituent layers, but also on the layer densities that can be varied. The methods for varying the layer density by controlling layer porosity will be readily understood by those having skill in the field of thermal spray coating.

TABLE 2

Density of Selected Layers of Iron Based Glass Alloys/Aluminum Composites

| Weight Fraction Super Hard Steel ™ | Weight Fraction Aluminum | Density (g/cm$^3$) |
|---|---|---|
| 1.00 | 0.00 | 7.50 |
| 0.90 | 0.10 | 7.02 |
| 0.80 | 0.20 | 6.53 |
| 0.75 | 0.25 | 6.29 |
| 0.66 | 0.34 | 5.85 |
| 0.60 | 0.40 | 5.56 |
| 0.50 | 0.50 | 5.08 |
| 0.40 | 0.60 | 4.60 |
| 0.33 | 0.67 | 4.26 |
| 0.30 | 0.70 | 4.11 |
| 0.25 | 0.75 | 3.87 |
| 0.10 | 0.90 | 3.14 |
| 0.00 | 1.00 | 2.66 |

What is claimed is:

1. A multi-layered metallic material comprising:
at least three or more alternating layers of:
   (a) a metallic glass layer comprising an iron based alloy that has a hardness of at least about 9.2 GPa wherein said alloy comprises one or more materials selected from the group consisting of $(Fe_{0.85}Cr_{0.15})_{83}B_{17}$, $(Fe_{0.8}Cr_{0.2})_{83}B_{17}$, $(Fe_{0.75}Cr_{0.25})_{83}B_{17}$, $(Fe_{0.6}Co_{0.2}Cr_{0.2})_{83}B_{17}$, $(Fe_{0.8}Cr_{0.15}Mo_{0.05})_{83}B_{17}$, $(Fe_{0.8}Cr_{0.2})_{79}B_{17}C_4$, $(Fe_{0.8}Cr_{0.2})_{79}B_{17}Si_4$, $(Fe_{0.8}Cr_{0.2})_{79}B_{17}Al_4$, $(Fe_{0.8}Cr_{0.2})_{75}B_{17}Al_4C_4$, $(Fe_{0.8}Cr_{0.2})_{75}B_{17}Si_4C_4$, $(Fe_{0.8}Cr_{0.2})_{75}B_{17}Si_4Al_4$, $(Fe_{0.8}Cr_{0.2})_{71}B_{17}Si_4C_4Al_4$, $(Fe_{0.7}Co_{0.1}Cr_{0.2})_{83}B_{17}$, $(Fe_{0.8}Cr_{0.2})_{80}B_{20}$, $(Fe_{0.8}Cr_{0.2})_{76}B_{17}Al_7$, $(Fe_{0.8}Cr_{0.2})_{79}B_{17}W_2C_2$, $(Fe_{0.8}Cr_{0.2})_{81}B_{17}W_2$, and $Fe_{64}Ti_3Cr_5Mo_2B_{16}C_5Si_1Al_2La_2$; and
   (b) a metal layer having a hardness of less than about 9.2 GPa, wherein said metal layer comprises aluminum, or aluminum alloys, wherein said metallic glass layer is bonded directly to said metal layer with a bond strength of at least about 5,000 psi, wherein said alternating layers individually have a thickness between about 50 µm to 500 µm.

2. The layered metallic material of claim 1 wherein said metal layer having a hardness of less than about 9.2 GPa comprises a face centered or body centered cubic crystal structure.

3. A method for protecting against a ballistic projectile comprising:
supplying an iron based glass forming alloy with a hardness value of x, wherein said alloy comprises one or more materials selected from the group consisting of $(Fe_{0.85}Cr_{0.15})_{83}B_{17}$, $(Fe_{0.8}Cr_{0.2})_{83}B_{17}$, $(Fe_{0.75}Cr_{0.25})_{83}B_{17}$, $(Fe_{0.6}Co_{0.2}Cr_{0.2})_{83}B_{17}$, $(Fe_{0.8}Cr_{0.15}Mo_{0.05})_{83}B_{17}$, $(Fe_{0.8}Cr_{0.2})_{79}B_{17}C_4$, $(Fe_{0.8}Cr_{0.2})_{79}B_{17}Si_4$, $(Fe_{0.8}Cr_{0.2})_{79}B_{17}Al_4$, $(Fe_{0.8}Cr_{0.2})_{75}B_{17}Al_4C_4$, $(Fe_{0.8}Cr_{0.2})_{75}B_{17}Si_4C_4$, $(Fe_{0.8}Cr_{0.2})_{75}B_{17}Si_4Al_4$, $(Fe_{0.8}Cr_{0.2})_{71}B_{17}Si_4C_4Al_4$, $(Fe_{0.7}Co_{0.1}Cr_{0.2})_{83}B_{17}$, $(Fe_{0.8}Cr_{0.2})_{80}B_{20}$, $(Fe_{0.8}Cr_{0.2})_{76}B_{17}Al_7$, $(Fe_{0.8}Cr_{0.2})_{79}B_{17}W_2C_2$, $(Fe_{0.8}Cr_{0.2})_{81}B_{17}W_2$, and $Fe_{64}Ti_3Cr_5Mo_2B_{16}C_5Si_1Al_2La_2$;
supplying a metal layer adapted of hardness value y wherein x>y, wherein said metal layer comprise aluminum, aluminum alloys or titanium;
applying said iron based glass forming alloy directly onto said metal layer wherein said glass forming alloy is produced by forming a molten alloy and cooling to form said glass alloy to form a multi-layered material adapted to resist penetration by said projectile, thereby forming a layered armor structure;
forming at least three alternating layers of said iron based glass forming alloy and said metal layer, wherein said layers individually have a thickness between about 50 µm-500 µm; and
locating said layered armor structure in an anticipated path of said projectile.

4. The method according to claim 3 wherein applying said iron based glass forming alloy comprises thermal spray coating said alloy onto said metal layer.

5. The method according to claim 3 wherein thermal spray coating comprises at least one of wire-arc spraying, plasma spraying, flame spraying, cold spraying, and high velocity oxy-fuel spraying.

6. The method of claim 3, wherein the iron based glass alloy has a density value "a" and said metal layer has a density value "b", and wherein b<a.

7. A multi-layered metallic material comprising:
at least three or more alternating layers of:
   (a) a metallic glass layer comprising an iron based alloy that has a hardness of at least about 9.2 GPa, wherein said alloy comprises one or more materials selected from the group consisting of $(Fe_{0.85}Cr_{0.15})_{83}B_{17}$, $(Fe_{0.8}Cr_{0.2})_{83}B_{17}$, $(Fe_{0.75}Cr_{0.25})_{83}B_{17}$, $(Fe_{0.6}Co_{0.2}Cr_{0.2})_{83}B_{17}$, $(Fe_{0.8}Cr_{0.15}Mo_{0.05})_{83}B_{17}$, $(Fe_{0.8}Cr_{0.2})_{79}B_{17}C_4$, $(Fe_{0.8}Cr_{0.2})_{79}B_{17}Si_4$, $(Fe_{0.8}Cr_{0.2})_{79}B_{17}Al_4$, $(Fe_{0.8}Cr_{0.2})_{75}B_{17}Al_4C_4$, $(Fe_{0.8}Cr_{0.2})_{75}B_{17}Si_4C_4$, $(Fe_{0.8}Cr_{0.2})_{75}B_{17}Si_4Al_4$, $(Fe_{0.8}Cr_{0.2})_{71}B_{17}Si_4C_4Al_4$, $(Fe_{0.7}Co_{0.1}Cr_{0.2})_{83}B_{17}$, $(Fe_{0.8}Cr_{0.2})_{80}B_{20}$, $(Fe_{0.8}Cr_{0.2})_{76}B_{17}Al_7$, $(Fe_{0.8}Cr_{0.2})_{79}B_{17}W_2C_2$, $(Fe_{0.8}Cr_{0.2})_{81}B_{17}W_2$, and $Fe_{64}Ti_3Cr_5Mo_2B_{16}C_5Si_1Al_2La_2$; and (b) a metal layer having a hardness of less than about 9.2 GPa, wherein said metal layer comprises aluminum, aluminum alloys or titanium and is bonded directly to said metallic glass layer, wherein said metallic glass layer material has a density and said metal layer has a density, and the density of said metallic glass layer is greater than the density of said metal layer wherein said alternating layers individually have a thickness between about 50 µm to 500 µm.

8. The layered metallic material of claim 7 wherein said metal layer having a hardness of less than about 9.2 GPa comprises a face centered or body center cubic crystal structure.

* * * * *